UNITED STATES PATENT OFFICE.

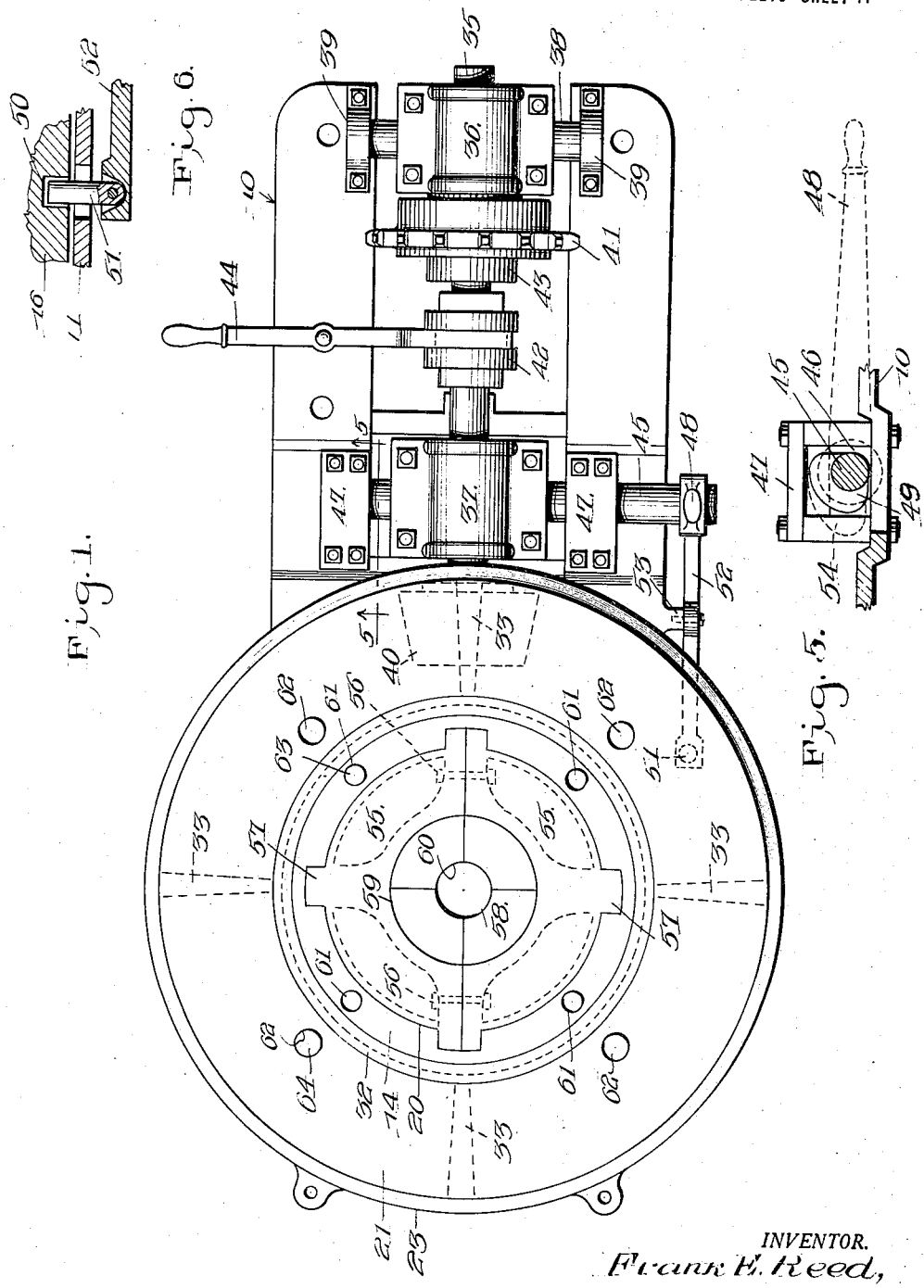

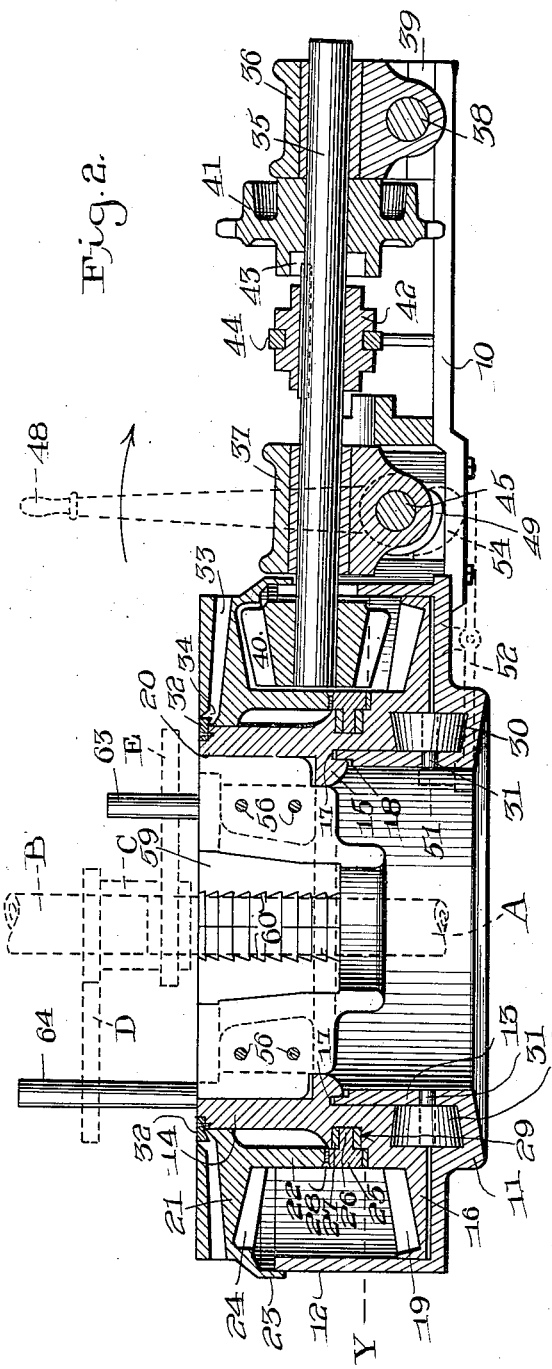

FRANK E. REED, OF HOUSTON, TEXAS.

PIPE-LAYING MACHINE.

1,409,407. Specification of Letters Patent. Patented Mar. 14, 1922.

Application filed November 29, 1920. Serial No. 427,005.

*To all whom it may concern:*

Be it known that I, FRANK E. REED, a citizen of the United States, and resident of Houston, in the county of Harris, State of Texas, have invented certain new and useful Improvements in Pipe-Laying Machines, of which the following is a specification.

My invention relates to pipe-laying machines but is so arranged as to enable it to be employed for other uses, such as rotating an earth boring tool, or any operation which requires a rotary movement or a relative rotary movement between two parts.

With my improved machine, sections of pipe, for instance, may be connected or disconnected by holding one section and rotating the other section thereof in the proper direction to thereby engage or disengage the screw threads carried on the ends of the sections of pipe.

My invention contemplates more particularly a base provided with a housing, in which housing there are mounted for rotation two members. A gearing for transmission of power to these two rotating members is mounted upon the base, together with an operating lever for causing the driving gear to operatively engage one or the other of the rotating members. An operating clutch is also provided so that the source of power may be continuous and caused to rotate the driving gear only when desired.

The several features and advantages of my improved construction will be made more apparent in the accompanying specification and drawings in which:

Figure 1 is a plan view of the machine,

Figure 2 is a longitudinal section thereof,

Figure 3 is a bottom plan view of one of the rotating members,

Figure 4 is a bottom plan view of the other rotating member,

Figure 5 is a section taken on lines 5—5 of Figure 1 looking in the direction of the arrow, and Figure 6 is a fragmentary sectional view of a latch member.

In the drawings numeral 10 indicates the base of the machine having formed integrally therewith a housing 11. The housing 11 is substantially U-shaped in cross section and provided with up-standing walls 12 and 13. As clearly illustrated, these up-standing walls are circular in plan view and arranged concentrically, forming between them an annular housing or recess which is open at its upper end.

Mounted for rotation upon the housing 11 is a rotary member 14 provided with an annular lug or rib 15 on its vertical wall and an annular projection 16 lying adjacent the bottom of the housing 11. The rib 15 is provided with an annular recess 17 while the wall 13 of the housing is correspondingly reduced as at 18 to enter the recess 17. The annular projection 16 is provided with gear teeth 19 for a purpose to be more fully hereinafter set forth. The rotary member 14 is provided adjacent its upper edge with vertically disposed recesses or guideways 20.

Positioned so as to lie flush with the upper edge of the member 14 is a second rotary member 21 formed with an annular downwardly projecting extension 22 and an annular lip 23 which bears against the wall 12 of the housing to prevent dirt or other foreign substance from gaining access to the interior of the housing. The rotary member 21 is provided with gear teeth 24 corresponding to the gear teeth 19 of the rotary member 14.

In order to prevent vertical displacement of the rotary member 21 and also to provide a bearing therefor, I aperture the wall 22 at equal radial points for the reception of plates 25 carrying projections 26 upon which are journalled bearing rollers 27. The plates 25 are secured in position by any means, such as bolts 28. To accommodate the bearing rollers 27 the member 14 has formed therein an annular bearing groove 29.

Disposed at equal radial points in the base of the housing 11 are frusto-conical bearing rollers 30 which may be journalled upon studs 31 projecting from the wall 13 of the housing. The weight of the two rotary members 14 and 21 is therefore borne by these rollers which assist materially in eliminating friction between the rotary parts and the housing.

In order to prevent foreign matter from gaining access to the inside of the housing 11 at the point where the member 21 abuts the member 14, I provide a ring 32 which may be secured to the member 14 as shown. Cooperating with this ring is a series of radially disposed drain openings 33 which communicate with an annular groove 34.

The ring 32 will direct any foreign matter into the groove 34 from which it will thereafter be discharged through the drain openings 33.

Mounted upon the base 10 is a power shaft 35 journalled in bearings 36 and 37. The journal 36 is pivoted to swing horizontally to the axial direction of the shaft 35 and for this purpose a shaft 38 pivotally engages the journal 36. The shaft 38 is journalled as indicated at 39. The other end of the shaft 35 has rigidly attached thereto a bevel gear 40 adapted to operatively engage either the gear teeth 19 or 24 on the rotary members 14 and 21 respectively. In order to rotate the gear 40 a sprocket wheel 41 is loosely mounted on the shaft 35 and cooperating therewith is a slidable clutch 42 keyed to the shaft 35 and slidable thereon into engagement with a cooperating clutch member 43 on the spur wheel by a clutch lever 44. The journal 37 is carried by a transversely disposed shaft 45, the ends of which are supported by cams 49. These cams 49 rotate 90° in housings of which 47 is the top side and base 10 the bottom side. One end of the shaft 45 projects beyond its cam 49 and has rigidly secured thereto a gear shifting lever 48. This structure is clearly illustrated in Figure 5, the operating lever 48, being shown in dotted lines because it is to the front of the line upon which the section is taken. The cams 49 are so positioned on the shaft 45 with respect to the operating lever 48 that when this lever is moved from its dotted line position shown in Figure 5 to a vertical position, each cam 49 is caused to rotate through an angle of 90° whereby it bears against the base 10 and moves the shaft 45 vertically. This vertical movement of the shaft 45 is transmitted to the journal 37 and the power shaft 35 which consequently rotates about its pivot 38 and causes the bevel gear 40 to engage the gear teeth 24 of the rotary member 21. By moving the lever 48 in an opposite direction the cams 49 are caused to engage the tops 47 of the housings and move the bevel gear 40 into engagement with the gear teeth 19 of rotary member 14.

When the bevel gear 40 is in mesh with the rotary member 21, it is desired that the rotary member 14 be locked to the housing 11. In order to accomplish this the annular projection 16 of the rotary member 14 is provided with a multiplicity of radially disposed holes or sockets 50. Cooperating with these sockets 50 is a pin 51 pivotally mounted upon one end of an arm 52 as clearly shown in Figure 6. The arm 52 is pivoted at 53 to the base 10 and has its other end extended to a position immediately under the gear shifting lever 48. In order that the arm 52 may be rocked the shaft 45 which carries the lever 48 is provided with a cam 54 adapted to engage the free end of the arm 52 as the lever 48 is swung from its horizontal position to its vertical position. The cam 54 rocks the arm 52 at the same time that the cams 49 move the bevel gear 40 into mesh with the gear teeth. A rocking movement of the arm 52 causes the pin 51 to engage one of the sockets 50 to lock the rotary member 14 to the housing. When the cam disengages the arm 52 the end of the arm carrying the pin will drop by gravity or spring force (not shown), thereby releasing the rotary member 14.

Removably secured on the rotatable member 14 is a spider-shaped supporting element 55 formed in two sections as illustrated in Figure 1 and secured together by means of bolts 56. This supporting element is provided with projections 57 which fit in the recesses or guideways 20 formed in the member 14. This supporting element is therefore prevented from rotating independently of the member 14 but may be easily removed for accommodating pipes of larger diameter or may be replaced by supporting elements of varied sizes. The two sections of the supporting element are shaped so as to form a circular passageway 58 concentric with the housing 11. The wall of the passageway 58 is tapered to accommodate a multiplicity of clutch segments 59 which are correspondingly tapered at their outer sides and are provided at their inner sides with biting teeth 60 formed by serrating these faces of the clutch segments. These clutch segments cooperate to hold a section of pipe in the supporting element 55.

The rotary members 14 and 21 have a multiplicity of radially disposed holes or sockets 61 and 62 respectively. These holes are to accommodate removable posts 63 and 64, for a purpose to be more fully hereinafter set forth. Lubricating oil may be supplied to the housing and retained at the level Y (see Figure 2) to thereby thoroughly lubricate the moving parts and relieve friction.

I will now describe the operation of my improved device when used for connecting or disconnecting sections of pipe. For the purpose of this description, I have illustrated in Figure 2, as shown in dotted lines, the adjacent ends of two sections of pipe indicated respectively at A and B, the section A thereof carrying the coupling sleeve C. I have also illustrated two pipe wrenches D and E of usual construction. With the pipe wrenches engaging the sleeve C and the pipe section B respectively, the posts 63 and 64 will be inserted each in the hole 61 or 62 which is nearest the handle of the corresponding wrench. It is therefore obvious that if the member 21 were now rotated the post 64 would take part in such rotary movement while the post 63 would remain fixed because it is carried by the member 14. It then follows that the wrench E would be held stationary while the wrench D is rotated.

In order to impart a relative movement to the parts hereinbefore mentioned the lever 48 is moved from its horizontal position illustrated in dotted lines in Figure 5 or to its vertical position illustrated similarly in Figure 2.

During this movement of the lever 48 the cams 49 engage the base 10 or cap 47 of the cam housing of the machine and swing the shaft 35 about its pivot 38 thereby causing the bevel gear 40 to engage the gear teeth 24 of the member 21 or teeth 19 of member 14. Inasmuch as the cam 54 has imparted to it a similar degree of rotation it is caused to engage one end of the arm 52 thereby rocking this arm about its pivot 53 and causing the pin 51 to enter one of the sockets 50 in the member 14. This locks the member 14 to the housing 11. Therefore, while the pinion 40 is in engagement with the gear teeth 24 of the rotary member 21 the member 14 will remain stationary by reason of its being locked to the housing.

The sprocket wheel 41 is continually driven from a suitable source of power, loosely on shaft 35. When a rotation of the shaft 35 is required it is only necessary to operate the clutch lever 44 which is keyed to the shaft 35 to slide this clutch member into engagement with the sprocket wheel 41. The sprocket wheel 41 will then be clutched directly to the shaft 35 and a rotary movement will be imparted to the bevel gear 40. With the parts in the position illustrated in Figure 2 the member 21 is ready to receive a rotary movement but it is obvious that when the gear lever 48 is moved to its horizontal position the bevel gear 40 will be caused to engage the gear teeth 19 to the member 14. To engage the gear teeth 19 it must move out of mesh with the gear teeth 24. This movement of the gear 40 and the appurtenant parts thereof will take place when the position of the cams 49 is reversed by moving the lever 48 from a vertical to a horizontal position. Thus it will be seen that cams 49 operate in the space between base 10 and cover plate 47 and consequently part 47 takes the vertical thrust and holds the bevel gear 40 in engagement with teeth 19. Because the gear 40 engages the teeth 19 and 24 on opposite sides of its axis, the members 14 and 21 will consequently be driven in opposite directions. Therefore, by properly applying the wrenches the sections of pipe may either be connected or disconnected. The power may be reversed to likewise cause the device to work in either direction.

When the device is used for drilling, the clutch segments 59 may be replaced by a bushing which rigidly holds the drill-shaft, and the member 14 caused to rotate, which, because of the connection just described will rotate the drill.

The structure thus described enables an efficient accomplishment of pipe-laying and drilling and embodies the features particularly desirable in devices of this character. The pipe sections may be easily rotated in either direction or the device may be just as quickly adapted for rotating a drill-shaft. The operating parts are contained within a housing which is so constructed and arranged as to prevent the admission of foreign matter which would prove disastrous. Most of the moving parts can be kept immersed in a lubricant while the rotating bevel gear dips constantly in the oil to lubricate the upper ring of gear teeth.

While I have illustrated one embodiment of my invention, it is obvious that various changes may be made in the specific structure without departing from the spirit and scope of the invention and I particularly reserve this right.

Having thus described my invention, what I claim is:

1. A device of the class described which comprises a pair of rotary members, gearing for rotating said members and means for shifting said gearing to operate either of said members.

2. A device of the class described which comprises a pair of rotating members, a gear for rotating said members, a housing, means operatable simultaneously for shifting said gear and locking one of said rotating members to the housing.

3. A device of the class described which comprises two rotary members, a housing containing said rotary members, a shiftable gear for rotating said members, a latch mechanism and means simultaneously operatable for moving said gear to rotate one of said members and for locking the other member to the housing.

4. A device of the class described which comprises a pair of circular rotating members, a housing containing said members, a pivoted driving shaft, a gear on said shaft, a latch mechanism and means operatable simultaneously for moving said pivoted shaft and for operating said latch, as and for the purpose set forth.

5. A device of the class described which comprises a pair of concentric rotating members, a ring of gear teeth on the adjacent faces of said rotating members, a housing enclosing said rotating members, a gear shiftable between the opposed rings of gear teeth, a pivoted shaft carrying said gear, means for rotating said shaft and means for positively moving said shaft in either direction, for the purpose described.

6. A device of the class described which comprises a pair of concentric rotatable members, a housing for said members, shiftable gearing for rotating said members, means for locking one of said members to the casing, said rotatable members being provided with a multiplicity of radially disposed sockets and removable posts for said sockets.

7. A device of the class described which comprises a pair of concentric rotatable members, a housing, a ring of gear teeth on the opposed faces of said rotatable members, a power shaft, means for rotating said shaft, means pivotally supporting said shaft at one end thereof, a gear mounted on the other end of said shaft and positioned between the opposed rings of gear teeth, and cam-actuated means for moving said gear into operative relation with either ring of gear teeth.

8. A device of the class described which comprises a pair of concentric rotatable members, a housing enclosing said members, a ring of gear teeth on the opposed faces of the rotatable members, a power shaft, means for rotating said shaft, means for pivoting said shaft at one end thereof, a gear mounted on the other end of said shaft, a transversely disposed shaft rotatably connected to the power shaft, cams carried by said transversely disposed shaft and means for rotating said shaft to bring the cams into operation, as and for the purpose set forth.

9. A device of the class described, comprising a plurality of rotary members, means for rotating said members and means for shifting said first mentioned means to operate either of said members.

10. A device of the class described, comprising a plurality of rotating members, means for rotating said members, a housing, means operable simultaneously for shifting said first mentioned means and locking one of said rotating members to the housing.

11. A device of the class described which comprises a plurality of rotary members, a housing containing said rotary members, a shiftable means for rotating said members, a latch mechanism and means simultaneously operable for moving said first mentioned means to rotate one of said members and for locking the other member to the housing.

12. A device of the class described, comprising a plurality of circular rotatable members, a housing containing said members, a driving shaft, driving means mounted upon said shaft, a latch mechanism and means operable simultaneously for moving said shaft and for operating said latch.

13. In a device of the character described, in combination, a pair of rotary members, means for rotating said members and means for shifting said first mentioned means to operate either of said members independent of the other.

FRANK E. REED.